United States Patent
Santi

[15] 3,689,605
[45] Sept. 5, 1972

[54] DETOXIFICATION OF DITHIOPHOSPHORIC ESTERS

[72] Inventor: Romano Santi, Milan, Italy

[73] Assignee: Montecatini Edison S.p.A., Milan, Italy

[22] Filed: June 17, 1969

[21] Appl. No.: 834,175

[30] Foreign Application Priority Data

June 19, 1968   Italy.....................17901 A/68

[52] U.S. Cl. ................260/990, 260/941, 260/942, 260/989, 424/212, 424/213
[51] Int. Cl. ............................A01n 9/36, C07f 9/16
[58] Field of Search..............260/990, 941, 942, 989

[56] References Cited

UNITED STATES PATENTS 2,879,284  3/1959  Divine et al. ..............260/989
2,962,521  11/1960  Usui ..........................260/989
2,980,723  4/1961  Frank et al. ...............260/989

Primary Examiner—Joseph Rebold
Assistant Examiner—Richard L. Raymond
Attorney—Curt M. Avery, Arthur E. Wilfond, Herbert L. Lerner and Daniel J. Tick

[57] ABSTRACT

Described is a method of reducing the toxicity to warm-blooded animals of dithiophosphoric esters of the formula:

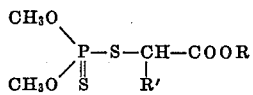

wherein R=alkyl with 1-5 carbon atoms, R'=phenyl or carboethoxymethyl. The method consists substantially in adding to the above esters, either undiluted or in solution, adequate quantities of acyl bromides or iodides.

7 Claims, No Drawings

DETOXIFICATION OF DITHIOPHOSPHORIC ESTERS

The present invention relates to a method which markedly reduces the toxicity of dithiophosphoric esters to warm-blooded animals.

In particular, the method of this invention can be profitably applied to products in the class defined by the formula:

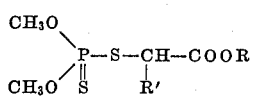

wherein R=alkyl with a linear or branched chain containing one to five carbon atoms, R'=phenyl or carboethoxymethyl.

The present method substantially consists in treating the technical grade products, whose toxicity to warm-blooded animals is to be reduced (detoxification), with bromides or iodides of aliphatic or aromatic organic acids. This is quite unforeseable and peculiar to acyl bromides and iodides, as the corresponding chlorides do not exercise any action at all.

The method of this invention is extremely simple, since it consists in adding to the product to be detoxified or to solutions containing said product, small quantities of acylic bromide and/or iodide dissolved in inert organic solvents, while stirring the whole for variable periods of time, depending on temperature, and finally removing the excess of acylic halides and volatile substances, if any. There occurs practically no loss of product or decrease in content.

As is well known to those skilled in the art, the evaluation of a pesticide is not based only on its activity against pests, but also on its toxicity to warm-blooded animals. This is not only in relation to the hazards, which may arise when handling pesticides during their application, but especially to the possible effects which may be exerted on humans when these products are used for agricultural purposes, because of their residues remaining on crops intended for consumption as food or in places where such pesticides are employed for household and public health uses. Consequently, there is a strong tendency towards employing substances which, for equal efficiency, have the lowest toxicity to warm-blooded animals. It must be emphasized, moreover, that if a product can be provided with a lower toxicity to warm-blooded animals, it can be used in field in which it would be otherwise precluded.

It is therefore evident that the discovery of a simple and inexpensive method to reduce the toxicity to warm-blooded animals, like the one covered by this invention, is very useful and a substantial contribution to technical progress in the specific field of pesticides.

The compounds under the above formula have long been known as pesticides, and some of them are currently in use, as for example ethyl mercaptophenyl acetate O,O dimethyl phosphorodithioate ("Cidial") and O,O dimethyl S (1.2 dicarboethoxyethyl) dithiophosphate ("Malathion").

The toxicity to warm-blooded animal of the compounds in the class concerned varies significantly with the method of preparation and also, in some cases, from one operation to another in the same process. It should also be noted that even highly pure products, e.i., with a high percentage of active ingredient, do not always reach a satisfactory level as far as their toxicity to warm-blooded animals is concerned.

This is clearly due to the fact that extremely small quantities of particular substances are sufficient to increase to a large extent the toxicity to warm-blooded animals.

The method of this invention does not involve the process for the preparation of products with a particularly high degree of purity in order to reach a satisfactory toxicity level for warm-blooded animals. On the other hand, these products, as already stated, do not always have the necessary characteristics as regards their toxicity to warm-blooded animals.

This aspect of the invention is particularly important from the technical and economic standpoint. Ethyl mercaptophenyl acetate O,O dimethyl dithiophosphate (hereinafter briefly referred to as Compound I), technical product, has an average toxicity between 200 and 1,000 mg/kg. The formula of this compound is:

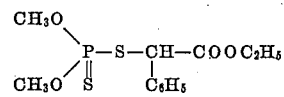

Technical products of O,O dimethyl S (1,2 dicarboethoxyethyl) dithiophosphate (hereinafter briefly referred to as Compound II), with a toxicity to warm-blooded animals ranging from about 1,000 mg/kg to 2,500 mg/kg, are available on the market.

The formula of this compound is:

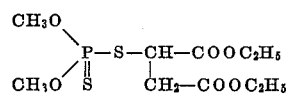

Isopropyl mercaptophenyl acetate O,O dimethyl dithiophosphate (hereinafter briefly referred to as Compound III) has a toxicity to warm-blooded animals between 210 and 1,100 mg/kg.

The formula of this compound is:

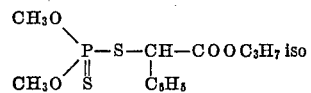

According to the process of this invention, even from products with lowest toxicity values, it is possible to obtain products with a toxicity of more than 2,000 mg/kg.

In French Patent Specification No. 1,507,651, is described a process consisting essentially of a treatment with adsorbing agents and the removal of the volatile substances contained in the dithiophosphoric ester, which makes it possible to markedly reduce in Compound I and like products the toxicity to warm-blooded animals.

The method of this invention is completely different and simpler from a technological point of view. In the precess according to this invention, as already said, the acylic bromides and/or iodides can be added directly to the product to be treated, or to solutions of said product in inert organic solvents. Detoxification can therefore be suitably carried out during production itself, namely, in its final stage, when solution of the product is achieved. The excess of acylic halides or volatile substances, if any, is removed together with the solvent by the usual techniques. However, if the product being treated has a toxicity to warm-blooded animals, at the highest possible level or almost so, it is best carrying out the treatment with acylic bromides or iodides on the product dissolved in a solvent and thereafter to remove the solvent and the volatile substances by distillation in a countercurrent of steam.

Temperature is not exactly critical since a fair degree of detoxification can be reached even at room temperature. The duration of the treatment depends on temperature and decreases as the latter increases.

Since, as is well-known, the dithiophosphoric esters of the class considered, if maintained for a long time at rather high temperatures (for example 90° – 100° C.), tend to decompose, those skilled in the art will operate in each single case at the temperature at which such decomposition does not occur or remains within acceptable limits, in order to obtain the best result in the shortest possible time. Consequently, it is not difficult for those skilled in the art, to establish, in each single case, the temperature and duration most convenient for the treatment. Excellent results can be obtained with the use of halides of aliphatic acids having a short chain of carbon atoms, such as, for example, acetyl bromide or iodide, or a long one, like stearoyl bromide or iodide, or of aromatic acids like benzoyl bromide or iodide. The choice of one or the other of these means may be made according to which is the most convenient.

The quantities of acylic halides, which are used in the treatments, are not significant; on an average, quantities ranging between 0.5 and 2 percent are sufficient.

The table hereinafter, which is reported merely to illustrate and not to limit the invention in any way, contains data obtained in detoxification tests.

| Product | Percent active substance (±1%) | Initial oral LD 50 for rat, mg./kg. (+) | Acylic halide, percent by weight | Length of treatment | Temp., °C. | Oral LD 50 for rat, mg./kg. | Percent active ingredient after detoxification (±1%) |
|---|---|---|---|---|---|---|---|
| Compound I | 92.9 | 625 | Acetyl bromide 1% | 2 h | 80 | 2,650 | 92.80 |
| Do | 92.9 | 625 | do | 4 h | 80 | 3,400 | 92.80 |
| Do | 92.9 | 625 | do | 7 h | 80 | 2,150 | 92.80 |
| Do | 92.9 | 625 | Acetyl bromide 0.5% | 4 h | 80 | 2,040 | 92.90 |
| Do | 92.9 | 625 | Propionyl bromide 1% | 4 h | 80 | 2,280 | 92.70 |
| Do | 92.9 | 625 | Butyryl bromide 1% | 4 h | 80 | 2,000 | 92.85 |
| Do | 92.9 | 625 | Benzoyl bromide 1% | 4 h | 80 | 2,370 | 92.50 |
| Do | 92.9 | 625 | 2 bromo propionyl bromide 1% | 4 h | 80 | 2,580 | 92.90 |
| Do | 92.9 | 625 | Lauroyl bromide 1% | 4 h | 80 | 2,600 | 93.00 |
| Do | 92.9 | 625 | Stearoyl bromide 1% | 4 h | 80 | 2,530 | 92.60 |
| Do | 92.9 | 625 | Acetyl iodide 1% | 4 h | 80 | 2,360 | 92.90 |
| Do | 92.9 | 625 | Acetyl chloride 1% | 4 h | 80 | 400 | 92.30 |
| Do | 92.9 | 625 | do | 7 h | 80 | 400 | 92.30 |
| Do | 92.8 | 400 | Acetyl bromide 2% | 5 days | 20–22 | 1,730 | 92.50 |
| Do | 92.0 | 1,020 | Acetyl bromide 1% | 24 h | 25 | 1,980 | 91.20 |
| Do | 92.0 | 1,020 | do | 48 h | 25 | 2,300 | 92.00 |
| Do | 92.0 | 1,020 | do | 5 days | 25 | 2,850 | 91.40 |
| Do | 92.0 | 1,020 | do | 4 h | 80 | 3,500 |  |

| Product | Percent active ingredient (±1%) | Initial oral LD 50 for rat mg./kg. | Acylic halide, percent by weight | Length of treatment | Temp., °C. | Oral LD 50 for rat, mg./kg. | Percent of active ingredient after detoxification (±1%) | Solvent |
|---|---|---|---|---|---|---|---|---|
| Compound I | 92 | 1,020 | Acetyl bromide 2% | 24 h | 25 | 2,600 | 91.10 |  |
| Do | 92 | 1,020 | do | 48 h | 25 | 3,000 | 92.80 |  |
| Do | 92 | 1,020 | do | 5 days | 25 | 2,080 | 91.60 |  |
| Do | 92.1 | 500 | Acetyl bromide 1% | 10 days | 50 | 2,900 | 92.10 |  |
| Do | 92.1 | 500 | do | 17 days | 50 | 2,350 | 91.80 |  |
| Do | 92.1 | 500 | do | 30 days | 50 | 2,600 | 91.70 |  |
| Do | 92.1 | 800 | do | 30 min | 90–95 | 1,880 | 92.00 | Dichloroethane. |
| Do | 92.1 | 800 | do | 1 h | 90–95 | 2,370 | 92.00 | Do. |
| Do | 92.1 | 800 | do | 2 h | 90–95 | 2,000 | 91.70 | Do. |
| Do | 92.1 | 800 | do | 4 h | 90–95 | 1,800 | 91.50 | Do. |
| Do | 92.1 | 800 | do | 7 h | 90–95 | 1,800 | 91.70 | Do. |
| Do | 92.1 | 800 | do | 1 h | 80 | 2,500 | 92.00 | Do. |
| Do | 92.1 | 800 | do | 2 h | 80 | 3,600 | 91.90 | Do. |
| Do | 92.1 | 800 | do | 4 h | 80 | 3,000 | 91.90 | Do. |

| Product | Percent active ingredient (±1.5%) | Initial oral LD 50 for rat, mg./kg. (+) | Acylic halide, percent by weight | Length of treatment | Temp., °C. | Oral LD 50 for rat, mg./kg. | Percent active ingredient after detoxification (±1.5%) |
|---|---|---|---|---|---|---|---|
| Compound II | 83.60 | 1,170 | Acetylbromide 1% | 30 min | 80 | 2,630 | 83.10 |
| Do | 83.60 | 1,170 | do | 1 h | 80 | 2,530 | 83.30 |
| Do | 83.60 | 1,170 | do | 2 h | 80 | 2,300 | 83.50 |
| Do | 83.60 | 1,170 | do | 4 h | 80 | 2,200 | 82.50 |
| Do | 83.60 | 1,170 | do | 24 h | 25 | 2,600 | 83.00 |
| Do | 83.60 | 1,170 | do | 48 h | 25 | 2,100 | 83.60 |
| Do | 83.60 | 1,170 | do | 5 days | 25 | 2,540 | 83.30 |
| Do | 83.60 | 1,170 | Acetyl bromide 2% | 30 min | 80 | 3,200 | 83.00 |
| Do | 83.60 | 1,170 | do | 1 h | 80 | 3,100 | 82.60 |
| Do | 83.60 | 1,170 | do | 2 h | 80 | 2,670 | 83.30 |
| Do | 83.60 | 1,170 | do | 4 h | 80 | 2,380 | 82.40 |
| Do | 83.60 | 1,170 | do | 24 h | 25 | 3,200 | 83.90 |
| Do | 83.60 | 1,170 | do | 48 h | 25 | 3,800 | 83.90 |
| Do | 83.60 | 1,170 | do | 5 days | 25 | 3,750 | 83.70 |
| Do | 90 | 1,340 | Acetyl bromide 1% | 1 h | 80 | 2,870 |  |
| Do | 90 | 1,340 | do | 2 h | 80 | 2,380 |  |
| Do | 90 | 1,340 | do | 4 h | 80 | 2,040 |  |
| Do | 90 | 1,340 | Acetyl bromide 1% | 7 h | 25 | 2,100 |  |
| Do | 90 | 1,340 | do | 24 h | 25 | 2,300 |  |
| Do | 90 | 1,340 | Acetyl bromide 2% | 7 h | 25 | 2,700 |  |
| Do | 90 | 1,340 | do | 24 h | 25 | 3,100 |  |
| Do | 90 | 1,340 | Acetyl chloride 2% | 2 h | 25 | 1,400 |  |

| Product | Percent active ingredient (±1%) | Initial oral LD 50 for rat, mg./kg. | Acylic halide, percent by weight | Length of treatment | Temp., °C. | Oral LD 50 for rat, mg./kg. | Percent active ingredient after detoxification (±1%) | Solvent |
|---|---|---|---|---|---|---|---|---|
| Compound III | 92.3 | 650 | Acetyl bromide 1% | 5 days | 25 | 2,670 | 92.10 | |
| Do | 92.3 | 650 | do | 2 h | 80 | 2,200 | 91.40 | |
| Do | 92.3 | 650 | do | 4 h | 80 | 2,200 | 92.00 | |
| Do | 92.3 | 650 | do | 7 h | 80 | 2,000 | 92.50 | |

(+) The LD 50 values were obtained by administering the product undiluted, via a stomach tube, to a mixed population (½ O:½ O) of adult albino rats weighing 100 g.

To further illustrate the invention, three examples of preparation are given below. It is understood that they shall not be construed as limiting the scope of the invention.

I — A glass reactor with a 40-1 capacity and provided with a water-circulation cooling or heating jacket, a stirrer and a vacuum connection was fed with 29 kg of Compound I (oral LD 50 for the rat = 435 mg/kg) containing 88 percent active ingredient. The reactor was heated by circulating hot water up to about 55° C. 310 g acetyl bromide are added, while stirring. The temperature was raised to 80° C. and was kept at this level for 3 hours and 45 minutes. The vacuum-pump was operated and the mass further stirred under vacuum at 2 mm/Hg for 15 minutes. Finally, the reactor was cooled to room temperature by circulating cold water. The product obtained, without loss in weight, has an oral toxicity for the rat of 2700 mg/kg and an 88 percent content.

II — When producing Compound I on an industrial 105 kg of product were obtained and dissolved in 160 kg dichloroethane. This solution was heated to 55° C. and 1.05 kg acetyl bromide were added. The mass was heated to 80° C. and was kept at this temperature for 2 hours, while stirring. The solution was then distilled in a column in countercurrent of steam. The solvent, which was not miscible with water, was recovered by condensation. The ester, in which some water was still dispersed, was allowed to decant and then dried under vacuum at 50° – 60° C., after separation of the aqueous phase. 102 kg of product at 92 percent active ingredient and an oral LD 50 for the rat of 2,500 mg/kg were obtained. A sample of the product derived from the dichloroethane solution by vacuum evaporation at 40° C., before the addition of acetyl bromide, was found to contain 91.8 percent active ingredient with an oral LD 50 for the rat of 800 mg/kg.

III — If the ester to be detoxified has a high toxicity level, it is best using the detoxifying method described hereinafter. A flask with a 1-1 capacity, provided with a reflux condenser and a water-circulation heating or cooling jacket was fed with 294 g of Compound I, at 88.5% active ingredient (oral LD 50 for the rat = 250 g/kg) dissolved in 445 g dichloroethane. 3 g acetyl bromide are added. The temperature was raised to 80° C. and the mass was stirred for 2 hours. Finally, the solvent and the volatile substances are removed by distillation in a counter-current of steam. 274 g of product with an oral LD 50 for the rat of 2,500 mg/kg and an active ingredient content of 94.5 percent were obtained.

I claim:

1. The method of reducing the toxicity of warm-blooded animals of dithiophosphoric esters of the formula:

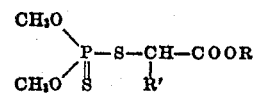

wherein R = alkyl with one to five carbon atoms
R' = phenyl or carboethoxymethyl which comprises adding to the above esters, an acyl halide of the formula:

wherein X = Br or I and
Z = alkyl or bromo alkyl with one to 20 carbon atoms, phenyl, maintaining the mass at 70°–90°, for periods between half an hour and 5 hours, removing the excess of acylic halide and volatile substances, which may be present under vacuum or by distillation in a countercurrent of steam.

2. The method of claim 1, wherein the dithiophosphoric ester is ethyl mercaptophenyl acetate O,O dimethyl dithiophosphate.

3. The method of claim 1, wherein the dithiophosphoric ester is O,O dimethyl S (1,2 dicarboethoxyethyl) dithiophosphate.

4. The method of claim 1, wherein the dithiophosphoric ester is isopropyl mercaptophenyl acetate O,O dimethyl dithiophosphate.

5. The method of claim 1, wherein the dithiophosphoric ester is ethyl mercaptophenyl acetate O,O dimethyl dithiophosphate, the acyl halide is acetyl bromide in a proportion of 1 percent, the temperature is 80°–90° C. and the duration of the treatment is between 2 and 4 hours.

6. The method of claim 1, wherein the dithiophosphoric ester is isopropyl mercaptophenyl acetate O,O dimethyl dithiophosphate, the acyl halide is acetyl bromide in a proportion of 1 percent, the temperature is 80° C. and the duration of the treatment is 4 hours.

7. The method of claim 1, wherein the dithiophosphoric ester is O,O dimethyl S (1,2 dicarboethoxyethyl) dithiophosphate, the acyl halide is acetyl bromide in a proportion of 2 percent, the temperature is 80° C. and the duration of the treatment is half to one hour.

* * * * *